United States Patent
Laubersheimer et al.

(10) Patent No.: US 8,133,831 B2
(45) Date of Patent: Mar. 13, 2012

(54) SLIP FOR THE PREPARATION OF DENTAL CERAMICS BY A HOT-MELT INKJET PRINTING PROCESS

(75) Inventors: Jurgen Laubersheimer, Buchs (CH); Gianluca Zappini, Torbole sul Garda (IT); Volker M. Rheinberger, Vaduz (LI)

(73) Assignee: Ivoclar Vivadent AG, Schaan (LI)

( * ) Notice: Subject to any disclaimer, the term of this patent is extended or adjusted under 35 U.S.C. 154(b) by 0 days.

(21) Appl. No.: 12/498,806

(22) Filed: Jul. 7, 2009

(65) Prior Publication Data
US 2010/0249305 A1 Sep. 30, 2010

(30) Foreign Application Priority Data
Mar. 27, 2009 (EP) .................................... 09156533

(51) Int. Cl.
C04B 35/48 (2006.01)
C08K 3/18 (2006.01)
C08K 3/22 (2006.01)
A61C 13/00 (2006.01)

(52) U.S. Cl. ........ 501/105; 501/103; 524/403; 524/430; 524/433; 264/16; 264/670; 523/115

(58) Field of Classification Search .................. 524/403, 524/430, 433; 264/16, 670; 501/103, 105; 523/115
See application file for complete search history.

(56) References Cited

U.S. PATENT DOCUMENTS

| 5,496,682 | A | | 3/1996 | Quadir et al. |
| 6,057,383 | A | * | 5/2000 | Volkel et al. ................. 523/116 |
| 6,117,612 | A | | 9/2000 | Halloran et al. |
| 6,322,728 | B1 | | 11/2001 | Brodkin et al. |
| 2010/0025874 | A1 | * | 2/2010 | Apel et al. ....................... 264/19 |
| 2010/0029801 | A1 | * | 2/2010 | Moszner et al. .............. 522/167 |

FOREIGN PATENT DOCUMENTS
DE 10 2006 015 014 A1 10/2007
WO 98/06560 A1 2/1998

OTHER PUBLICATIONS

Fouassier, eds., Radiation Curing in Polymer Science and Technology, vol. II, London and New York, NY:Elsevier Applied Science (1993).
Gebhardt, "Vision Rapid Prototyping," DKG 83(13):7-12 (2006).
Seerden et al., "Ink-Jet Printing of Wax-Based Alumina Suspensions," J. Am. Ceram. Soc. 84(11):2514-2520 (2001).
European Search Report for EP 09156533.3 (Sep. 3, 2009).
http/en.wikipedia.org/wiki/slip_(cermaics) "Slip (ceramics)", Jan. 24, 2011.

* cited by examiner

Primary Examiner — David W Wu
Assistant Examiner — Vu A Nguyen
(74) Attorney, Agent, or Firm — Ann M. Knab

(57) ABSTRACT

Slip for use in a hot-melt inkjet printing process which contains (A) ceramic particles, (B) wax and (C) at least one radically polymerizable monomer, and use of the slip to prepare dental restorations. Furthermore, a process for the preparation of a green compact is described, in which the slip is molded in layers to the geometrical shape of the green compact and subjected to a radical polymerization in order to obtain a cured green compact.

13 Claims, 7 Drawing Sheets

SLIP FOR THE PREPARATION OF DENTAL CERAMICS BY A HOT-MELT INKJET PRINTING PROCESS

This application claims the benefit of European Patent Application Serial No. 9156533.3, filed Mar. 27, 2009, which is hereby incorporated by reference in its entirety.

FIELD

The present invention relates to a slip for use in a hot-melt inkjet printing process, in particular for the preparation of ceramic compacts, such as e.g. dental inlays, onlays, veneers, crowns, bridges and frameworks.

BACKGROUND

Ceramic compacts can be prepared in various ways and by different processes. Decisive for the choice of the suitable moulding process are the raw products that are available for the material system in question, the size, the required precision and fidelity to detail of the components to be prepared and, last but not least, economic aspects.

In the preparation of naturally small ceramic compacts for dental prosthetics, the requirements in respect of component precision and accuracy of detail are very strict. For the most part, biocompatible ceramics suitable for use in medicine or dentistry are used in a special fine, highly pure form as raw material.

The preparation of dental restorations is traditionally the work of craftsmen. Dentists remove damaged tooth substance and replace it with plastic filling materials (amalgam, composite). In the case of larger defects, the restoration is prepared by a dental technician. This so-called indirect preparation involves impressions and models, and it is generally a few days before the restoration can be inserted in the mouth of the patient. This traditional preparation by craftsmen is time-consuming, expensive and, for the patient, requires several sessions with the dentist. In addition, the quality of the dental technician's work can scarcely be monitored. To reduce costs, in the last few years the work of dental technicians has increasingly been transferred to low-wage countries.

For the last few years there has also been the possibility of the "automated" preparation of dental prosthetics with CAD/CAM systems. After making a digital impression (scanning in the mouth of the patient or on a duplicate model), the dental prosthetic can be milled or ground from solid material on the basis of the scan data with a milling machine. In the case of minor work, this is even directly possible in the dentist's chair. Waiting times for the patient are thereby clearly reduced and quality checks can be taken into account in the software. However, these preparation processes involving the removal of material have the disadvantage that most of the high-performance ceramic used is lost. In addition, until now the machines used have been expensive, noisy and high-maintenance.

Instead of the material- and tool-intensive processes involving the removal of material, so-called "constructive processes" could be used. The terms "rapid prototyping", "rapid manufacturing", "solid freeform fabrication" and "generative manufacturing processes" are often used as synonyms for these "constructive" possibilities. The above-named terms cover various generative manufacturing processes in which 3-dimensional models or components are prepared from computer-aided design data (CAD data) (A. Gebhardt, *Vision of Rapid Prototyping*, Ber. DGK 83:7-12 (2006)). Examples of typical rapid prototyping processes are stereolithography, 3D printing and inkjet modelling. The principle of rapid prototyping is based on the layered construction of a three-dimensional component. Two-dimensional layers (XY plane) are laid on top of one another. Depending on the thickness of the layers, there is a greater or lesser degree of gradation of the component in the direction of construction (Z direction). It is expected that this preparation is substantially more cost-effective to implement than processes involving the removal of material. The main potential for savings lies in the use of less material. In addition, constructive processes allow a parallel manufacture which will bring a significant saving in time and increase in productivity.

Besides stereolithography (U.S. Pat. No. 5,496,682 A; U.S. Pat. No. 6,117,612 A) 3D printing is also a widespread process for the preparation of ceramic compacts. In this process, a binding-agent solution is printed into a powder bed. The binding agents glue the powder particles together and thus form a consolidated two-dimensional structure from powder. After each layer thus prepared, a new layer of loose powder is applied to the 2D structure into which binding agent is again sprayed. Repeating this step many times produces a three-dimensional article constructed from many layers which can easily be exposed by removing the unconsolidated powder. If ceramic powder is used, the binding agent must be burnt out and the ceramic subsequently compacted by a sintering process.

Although a 3D printing process is described as suitable for the preparation of a dental restoration in U.S. Pat. No. 6,322,728 B1 because of the low packing density of the powder bed and the resultant high porosity of the 3D article after the burning out of the binding agent, it is however generally very difficult to obtain a dense sintered compact from this. Usually, according to this process, mould densities of less than 50% of the theoretical density can be achieved after debinding and compacting, and of less than 95% of the theoretical density after dense sintering. These low densities of the desired workpieces result in only an inadequate final strength and thus can hardly be used as dental workpieces.

A further generative manufacturing process which is suitable for the preparation of ceramic compacts is inkjet printing or inkjet modelling, also called multi-jet modelling or printing when there are several printheads. Analogously to the principle of the standard inkjet printer known from everyday office routine, in this case, 3D articles are printed directly, by delivering liquid, also polymerizable modelling materials ("inks") in defined drops through one or more nozzles, the ink curing and thus forming the layers in the XY plane. At the same time, an easily removable supporting material can be imprinted. Repeated printing of layers of modelling and optionally supporting material on top of each other produces a three-dimensional article. After separating the printed article from the supporting structure, for example by selective chemical dissolution of the supporting material, a 3D component is left.

The inks used must be very highly liquid (low-viscosity) at the temperature in the pressure nozzle. Furthermore, suitable inks should not contain particles if at all possible, since otherwise the nozzles which typically have a diameter of approximately 100 µm or less can clog up and a continuation of the printing process is prevented. In the case of filler-containing inks, i.e. suspensions of particles in a liquid, only suspensions with a very low fill level have previously been able to be used, wherein the particles themselves must be very small, normally <1 µm, but at least substantially smaller than the average diameter of the nozzle (the printhead manufacturers quote $1/20^{th}$ of the average nozzle diameter as a guideline). However, the use of fine particles as filler has the consequence that the viscosity of the ink increases and an imprinting is made difficult or prevented because of this.

Until now, suspensions (slips) that contain only a few % by weight of filler have been used as ceramic-filled inks for the inkjet printing of 2D layers or 3D articles. In simple cases, these are suspensions based on water or low-boiling alcohols, during the use of which, however, very thin layers of low height can be produced, but often no actual three-dimensional solids. In addition, defects or cracks often occur as a result of the drying of the printed structures.

Often, therefore, waxes which are imprinted in the hot-melt inkjet printing process are also used to print 3D articles. The waxes are very highly liquid in the printhead at the increased temperatures and solidify when or immediately after striking the surface to be printed on. Where waxes are used as dispersant, higher levels of filling of about 20-30% by vol. can also be achieved, wherein (oxide) ceramic powders can also be used as fillers. An attempt is made to compensate for the high viscosity of the filled waxes that is the inevitable consequence of the high level of filling, by printing at comparatively very high temperatures of 140° C. and above. On the one hand, the printheads and their components such as supply line and nozzle are exposed to a high stress, on the other hand, it is very difficult, if not impossible, to obtain dense, solid ceramic components from the printed 3D articles, even at the named, comparatively high levels of filling of ceramic powder. In addition, the subsequent burning out of the organic constituents is in most cases accompanied by a significant deformation of the printed components and, moreover, the resultant porosity of the debound compacts is too high, i.e. the ceramic density is too low to prepare a dense microstructure by a following sintering process.

DE 10 2006 015 014 discloses a process for the preparation of ceramic moulds by layered inkjet printing of a suspension which contains 50 to 80% by weight ceramic particles, an aqueous boehmite sol, a low-molecular alcohol, a drying inhibitor and an organic deflocculator, followed by drying and curing (sintering) of the layered composite. Preferably, each individual layer is dried before the application of the next layer and after construction of the three-dimensional solid the latter is dried again as a whole. The process is said to be suited to the preparation of tooth implants, inlays, crowns and bridges. The extremely long time required to carry out this process is a disadvantage, since each individual imprinted layer must be dried. Furthermore, the theoretical densities of the sintered moulds that are supposedly achieved with the process correspond to only modest mechanical strength properties in up to 98% of cases.

Seerden et al. (*J. Am. Ceram. Soc.* 84(11):2514-2520 (2001)) state that unburned ceramic articles that are dimensionally accurate to within <100 μm can be obtained by means of hot-melt inkjet printing of $Al_2O_3$ wax slips with a level of filling of up to 30% by vol. Neither the behaviour of the thus-produced 3D articles during debinding and sintering nor the properties of the sintered ceramic compacts are described. The preparation of dental restoration materials is not disclosed.

SUMMARY

An object of the invention is to overcome the disadvantages of the known state of the art and provide a ceramic slip that can be processed by means of inkjet printing. In particular, it is to be possible to prepare, with the slip in the successive treatment steps, debinding and dense sintering, ceramic compacts with a good fidelity to detail, homogeneous microstructure and high final density of >98% of the theoretical density and thus high final strength.

BRIEF DESCRIPTION OF THE DRAWINGS

FIG. 3 shows discs which were prepared with a slip not according to the invention (does not contain monomer (C)).

FIG. 4 shows a disc which was prepared with a slip not according to the invention (does not contain wax (B)).

FIG. 5 shows the surface of the disc from FIG. 4.

FIG. 6 shows discs from a slip according to the invention (Example 1).

FIG. 7 shows the surface of the discs from FIG. 6.

DETAILED DESCRIPTION

Figure 1:
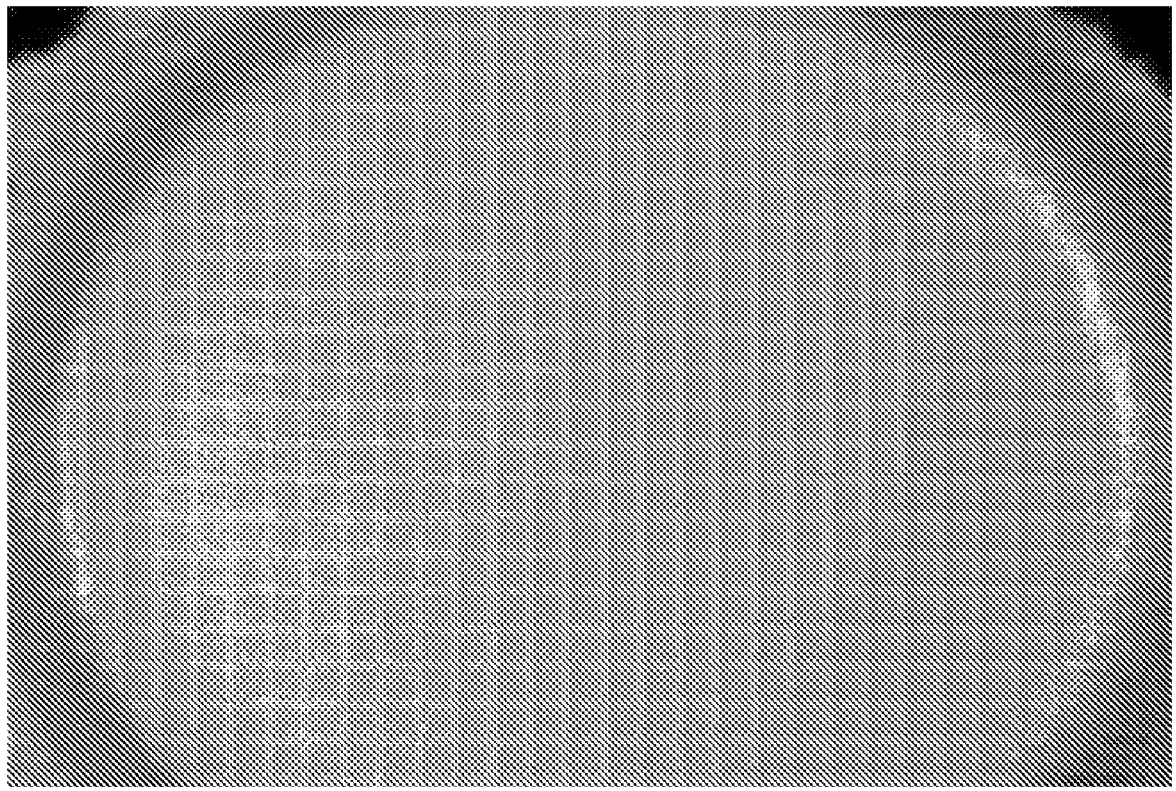
FIG. 1 shows a disc prepared with a slip according to the invention in the inkjet process.

The object is achieved by a slip for use in a hot-melt inkjet printing process, containing (A) ceramic particles and (B) wax, characterized in that it additionally contains (C) at least one radically polymerizable monomer.

The invention is also directed towards the use of the slip for the preparation of ceramic compacts, in particular dental restorations.

Furthermore, the present invention also relates to a process for the preparation of a green compact, in which the slip is moulded in layers to the geometrical shape of the green compact and then subjected to a radical polymerization in order to obtain a cured green compact. The green compact is preferably constructed in layers by a layered hot-melt inkjet printing process, the curing preferably by photopolymerization. The subject of the invention is furthermore a process for the preparation of a ceramic compact in which the green compact is further processed by subjecting the green compact to a heat treatment to remove the binding agent (debinding), in order to obtain a white body, and then dense sintering the white body.

Component (A) of the slip according to the invention is ceramic particles, wherein the term "ceramic particles" covers both oxide ceramic particles and glass ceramic particles and mixtures thereof. By ceramics are meant inorganic materials which have a crystalline structure and are usually prepared from corresponding powders. The preparation of the ceramic preferably takes place by sintering (sintered ceramic). Oxide ceramics are preferably obtained by sintering metal oxide powders such as e.g. $ZrO_2$ or $Al_2O_3$. Besides a crystalline phase, glass ceramics additionally also contain one or more glass phases. Glass ceramics are materials which are usually prepared from amorphous glasses, in particular silicate glasses, by controlled crystallization and in which a glass phase and one or more crystal phases are present alongside each other in the solid. In the case of sinterable glass ceramics, both glass powders and glass ceramic powders can be used as a starting point. Suitable glass ceramic particles are for example sinterable glass ceramic particles based on leucite- or lithium disilicate-reinforced glasses.

The ceramic particles used as component (A) are preferably oxide ceramic particles, in particular based on $ZrO_2$ and/or $Al_2O_3$, for example oxide particles of pure $ZrO_2$, pure $Al_2O_3$, pure $ZrO_2$—$Al_2O_3$, $ZrO_2$ or $ZrO_2$—$Al_2O_3$, which is stabilized with $HfO_2$, CaO, $Y_2O_3$, $CeO_2$ and/or MgO. The term "pure" is to be understood to mean "chemically pure", i.e. a $ZrO_2$ or $Al_2O_3$ ceramic is constructed only from $ZrO_2$ or $Al_2O_3$. In addition to the base oxide such as $ZrO_2$ or $Al_2O_3$, stabilized ceramics contain a stabilizer which is preferably selected from CaO, $Y_2O_3$, $CeO_2$, MgO and mixtures thereof. The stabilizer is preferably used in a quantity of 3 to 5% by weight, relative to the mass of the stabilized ceramic. High-strength $ZrO_2$ ceramics preferably contain 3 to 5% by weight $Y_2O_3$ (yttrium oxide) to stabilize the tetragonal crystal structure. This $ZrO_2$ ceramic is called Y-TZP (yttrium-stabilized tetragonal zirconium dioxide polycrystals). Ceramic particles which contain only base oxide and stabilizer are particularly preferred.

The ceramic particles should be substantially smaller than the average diameter of the nozzle of the printhead of the inkjet printer with which the slip is printed. In order to make possible printing with common inkjet printers that have a nozzle diameter of approximately 100 µm or less, so-called submicron powders are preferably used in the slips according to the invention, i.e. ceramic particles with a maximum particle size less than or equal to 5 µm, in particular less than or equal to 1 µm. Preferably, the particles measure 0.01 to 5 µm, particularly preferably 0.1 to 1 µm and quite particularly preferably 0.3 to 0.6 µm.

By "particle size" is meant the actual size of the ceramic particles as they are present in the slip. This is typically the primary particle size, since any agglomerates present in the ceramic powder are largely decomposed into primary particles during the preparation of the slip. However, agglomerates of ceramic primary particles can also be present in the slip, as long as they are small enough to be able to be printed with the desired inkjet nozzles, i.e. in preferred embodiments the agglomerates as a whole meet the above particle size requirements.

In the case of $Al_2O_3$, the size of the particles used as component (A) is preferably in the range from 50 to 500 nm, particularly preferably between 75 and 200 nm; in the case of $Y_2O_3$-stabilized $ZrO_2$, in the range from 50 nm to 500 nm, quite preferably between 50 and 350 nm.

The particle sizes are the absolute upper and lower limits.

The ceramic particles are preferably approximately spherical. Furthermore it is beneficial if the particles are present in non-agglomerated form, for example completely or predominantly in the form of primary particles.

An example of preferred ceramic particles are oxide particles of $Y_2O_3$-stabilized $ZrO_2$ which can be obtained e.g. under the trade name TZ-3YS-E from Tosoh Corporation, Tokyo, JP.

Component (B) of the slip according to the invention is a wax. In the present invention, the term "wax" is to be understood as defined by the Deutschen Gesellschaft für Fettwissenschaft [German Society for Fat Science] in the DGF standard method M-I 1 (75). Since the chemical composition and origin of different waxes vary greatly, waxes are defined only via their mechanical/physical properties. A material is called a wax if it can be kneaded at 20° C., is strong to brittle hard, has a coarse to finely crystalline structure, and is translucent to opaque in colour, but not glass-like; it melts above 40° C. without decomposing, is readily liquid (of low viscosity) a little above the melting point and not stringy; it has a strongly temperature-dependent consistency and solubility, and can be polished under light pressure. Typically, waxes pass into the molten state between 40° C. and 130° C.; waxes are normally water-insoluble. Preferably, waxes for use in the slips according to the invention have a melting point in the range from 40 to less than 80° C., particularly preferably from 45 to 65° C. and quite particularly preferably from 54 to 56° C. Preferred waxes have a viscosity of $\leq 10$ mPa·s, in particular 5 to 10 mPa·s and particularly preferably 3 to 4 mPa·s at 80° C. and a shear rate of 1000 $s^{-1}$.

Depending on their origin, waxes are divided into three main groups: natural waxes, wherein a further distinction is made here between vegetable and animal waxes, mineral waxes and petrochemical waxes; chemically modified waxes and synthetic waxes. The wax used as component (B) in the slip according to the invention can consist of one wax type or also of mixtures of different wax types. In the present invention, petrochemical waxes are preferably used, such as for example paraffin wax (hard paraffin), petrolatum, microwax (micro paraffin) and mixtures thereof, particularly preferably paraffin wax. Paraffin waxes that are commercially available as injection moulding binders for the manufacture of oxide ceramic and non-oxide ceramic components in the hot-moulding process (low-pressure injection moulding) are very suitable, e.g. paraffin wax with a melting point of approx. 54-56° C., a viscosity of 3-4 mPa·s at 80° C. and a shear rate of 1000 $s^{-1}$ which can be obtained from inter alia Zschimmer & Schwarz (Lahnstein, DE) under the name SILIPLAST. Commercially available waxes often already contain emulsifiers and/or other components to adjust the rheology.

As wax component (B), it is also possible to use vegetable waxes, e.g. candelilla wax, carnauba wax, Japan wax, esparto wax, cork wax, guaruma wax, rice germ oil wax, sugar cane wax, ouricury wax, montan wax; animal waxes, e.g. beeswax, shellac wax, spermaceti, lanolin (wool wax), rump fat; mineral waxes, e.g. ceresin, ozokerite (earth wax); chemically modified waxes, e.g. montan ester waxes, sasol waxes, hydrogenated jojoba waxes, or synthetic waxes, e.g. polyalkylene waxes, polyethylene glycol waxes.

Component (C) of the slip according to the invention is at least one radically polymerizable monomer. Preferably, the monomer is solid at 20° C. and has a melting point in the range from 30 to 120° C., particularly preferably from 40 to 80° C. and in particular from approx. 50° C. Preferably, the monomer is homogeneously miscible, i.e. without phase separation, with the wax (B) in both the solid and the liquid state. The monomer should not decompose at processing temperature, for instance at the below-described temperature during inkjet printing. Typically, the monomer has a large non-polar residue, e.g. a $C_8$ to $C_{20}$ residue. Suitable monomers often have a wax-like appearance and a wax-like consistency.

In particular, monomers which have one or more, e.g. two, (meth)acryloyl groups are used in the slip according to the invention, wherein monomers with (meth)acryloyloxy groups are preferred. Examples of suitable radically polymerizable monomers are (meth)acrylates and di(meth)acrylates with a chain length of the alcohol residue of $C_8$ to $C_{18}$, such as for example octadecyl acrylate; poly(meth)acrylated glycols, in particular poly(meth)acrylated propylene glycols; poly (meth)acrylated short- to medium-chain polypropylene glycols with a preferred $M_w$ of 200-2000, particularly preferably 700-1000, such as for example dipropylene glycol diacrylate and polypropylene glycol diacrylates, e.g. polypropylene glycol 700 diacrylate; pentaerythritol di(meth)acrylate monocarboxylates with a chain length of $C_8$ to $C_{18}$, such as for example pentaerythritol diacrylate monostearate, and mixtures thereof. The acrylated monomers are preferred to the methacrylated monomers, in particular the above-named acrylated monomers are preferred. In an embodiment of the present invention, component (C) is a mixture of octadecyl acrylate and pentaerythritol diacrylate monostearate.

The level of filling of a preferred slip composition is 25 to 45% by vol., preferably 30 to 40% by vol., ceramic particles, relative to the total volume of the slip.

A preferred slip composition according to the present invention contains:
(A) 25 to 45% by vol., preferably 30 to 40% by vol., in particular 33 to 38% by vol. ceramic particles,
(B) 25 to 50% by vol., preferably 30 to 45% by vol., in particular 30 to 35% by vol. wax, and
(C) 10 to 40% by vol., preferably 15 to 30% by vol., in particular 22 to 27% by vol. one or more radically polymerizable monomers, in each case relative to the total composition of the slip.

Preferably, the slip according to the invention contains a polymerization initiator as component (D).

Suitable polymerization initiators are radical polymerization initiators, in particular photoinitiators. The known radical photoinitiators for the visible range (cf. J. P. Fouassier, J. F. Rabek (eds.), *Radiation Curing in Polymer Science and Technology*, Vol. II, Elsevier Applied Science, London and New York (1993), which is hereby incorporated by reference in its entirety) can be used, such as e.g. acyl or bisacylphosphine oxides, preferably α-diketones, such as 9,10-phenanthraquinone, diacetyl, furil, anisil, 4,4'-dichlorobenzil and 4,4'-dialkoxybenzil and camphorquinone. To accelerate the initiation, α-diketones are preferably used in combination with aromatic amines. Redox systems which have particularly proved themselves are combinations of camphorquinone with amines, such as N,N-dimethyl-p-toluidine, N,N-dihydroxyethyl-p-toluidine, 4-dimethylaminobenzoate or structurally related systems.

Particularly preferred photoinitiators are Norrish type I photoinitiators, above all monoacyl trialkyl or diacyl dialkyl germanium compounds, such as e.g. benzoyl trimethyl germanium, dibenzoyl diethyl germanium or bis(4-methoxy benzoyl) diethyl germanium. Mixtures of the different photoinitiators can also be used, such as e.g. dibenzoyl diethyl germanium combined with camphorquinone and 4-dimethylaminoethyl benzoate.

The polymerization initiator (D) is preferably used in a quantity of 0.001 to 3.0% by vol., quite particularly preferably 0.01 to 1% by vol., in each case relative to the total mass of the slip.

In addition to the above-named components, the slip according to the invention can optionally contain further additives (E), such as for example accelerators (activators), stabilizers (inhibitors), dispersion auxiliaries, emulsifiers, melt viscosity-lowering substances (component used to adjust the rheology), chromophoric components and combinations thereof.

Suitable accelerators are for example those named above in connection with the polymerization initiators.

The inhibitors or stabilizers improve the storage stability of the slips and also prevent an uncontrolled polyreaction. The inhibitors are preferably added in such a quantity that the slips are storage-stable over a period of approx. 2-3 years. Examples of suitable initiators comprise the 2,2,6,6-tetramethylpiperidine-1-oxyl radical (TEMPO), phenothiazine, iodine and copper(I) iodide. The inhibitors are preferably used in a quantity of 5 to 500 ppm by weight, particularly preferably 50 to 200 ppm by weight, in each case relative to the total mass of the monomer(s). Relative to the total composition of the slip, the inhibitors are preferably used in a quantity of 0.03 to 3% by vol., preferably 0.3 to 1.2% by vol.

Any customary dispersion auxiliary can be used as dispersion auxiliary for dispersing oxidic particles in a non-polar medium. Typically, suitable dispersion auxiliaries have a polar "anchor group" which can be bonded to the particle surface, and a non-polar group, pointing away from the particle, which effects a maximum steric stabilization of the suspension. Preferred dispersion auxiliaries are polyester-based dispersion auxiliaries, such as e.g. Hypermer LP-1 from Uniqema, GB. The dispersion auxiliary is preferably used in a quantity of 0.1 to 5% by weight, preferably 0.5 to 2% by weight and in particular 1 to 1.5% by weight, in each case relative to the total mass of ceramic particles. Relative to the total composition of the slip, the dispersion auxiliaries are preferably used in a quantity of 0.3 to 16% by vol., preferably 1.6 to 6.4% by vol. and in particular 3.2 to 4.8% by vol.

A melt viscosity-lowering substance can be added to the slip according to the invention in order to lower its viscosity in the liquid state. For example, longer-chain ($C_8$-$C_{20}$) olefins, solid at room temperature, with a low melting point are suitable for this, such as for example hexadecene and octadecene.

The usual colorants or pigments are not suitable as chromophoric component according to the invention, since they are not stable enough to survive the debinding or sintering process. According to the invention, reactive transition metal compounds which are soluble in the wax and do not adversely affect the course of the photocuring and which on the other hand form chromophoric transition metal ions during the debinding of the prepared ceramic green compact or the sintering of the ceramic white body obtained therefrom are used as chromophoric component. Transition metal compounds preferred as chromophoric component are in particular acetylacetonates or carboxylic acid salts of the elements iron, cerium, praseodymium, lanthanum, tungsten, osmium, terbium and manganese. The salts of the carboxylic acids, acetic, propionic, butyric, 2-ethylhexylcarboxylic, stearic and palmitic acid are preferred. Above all the corresponding Fe, Pr, Mn and Tb compounds such as e.g. iron (III) acetate or acetyl acetonate, manganese (III) acetate or acetyl acetonate, praseodymium (III) acetate or acetyl acetonate or terbium (III) acetate or acetyl acetonate and also the corresponding carboxylic acid salts are particularly preferred. The chromophoric component is preferably used in a quantity of 0.00001 to 2.0% by weight, particularly preferably 0.001 to 1.0% by weight and quite particularly preferably 0.01 to 0.5% by weight, relative to the total mass of the ceramic particles (A).

The total quantity of component(s) (E) is preferably 0.1 to 15% by vol., particularly preferably 0.1 to 10% by vol., quite particularly preferably 0.5 to 9% by vol. and in particular 1.5 to 5% by vol., relative to the total composition of the slip.

All the quoted percentages by volume can, unless otherwise indicated, be converted into percent by weight using the density of the respective component.

Usually, the slip has a paste-like to solid consistency, in particular a solid paste-like to solid consistency, at 20° C. A sedimentation of the ceramic particles is thus avoided and a high storage-stability guaranteed. At 80° C. and at a shear rate of 1000 $s^{-1}$ it preferably has a viscosity of $\leq 200$ mPa·s, particularly preferably $\leq 100$ mPa·s. The slip according to the invention can preferably be imprinted at a corresponding temperature with an inkjet printer which has a printhead nozzle with a diameter of approximately 100 μm.

The slips according to the invention can be dispersed by dispersing the ceramic particles in a mixture of wax, monomers and optional additives. The dispersion preferably takes place at a temperature at which the wax and preferably also the monomers are liquid, preferably at 70 to 110° C. According to a further preferred embodiment, the dispersion takes place applying high shear rates, for example at 500 to 5000 $s^{-1}$. The filler can for example be dispersed using a dissolver (e.g. Dispermat® from VMA-Getzmann GmbH, Reichshof, DE) at speeds of up to 20,000/r.p.m., and preferably at an increased temperature of 70 to 110° C. in the mixture of wax, monomers and optional additives. Under these conditions, agglomerates of the preferred ceramic powders are largely divided to the primary particles. Should the viscosity in the liquid slip be too high, it is reduced, by adding viscosity-lowering substances, to values of preferably ≦200 mPa·s, particularly preferably ≦100 mPa·s, measured at a shear rate of 1000 s$^{-1}$ and a temperature of 80° C.

The slips according to the present invention are particularly suitable for use in hot-melt inkjet printing, but in principle they can also be used in other processes, for example a green compact from the slip according to the invention can also be prepared according to a different generative manufacturing process, such as for example by stereolithography, or in the hot-moulding process (low-pressure injection moulding).

A green compact is preferably prepared from the slip according to the invention by moulding the slip in layers in a hot-melt inkjet printing process to the geometric shape of the green compact and subjecting it to a radical polymerization, particularly preferably photopolymerization, in order to obtain a cured green compact. In one embodiment, each individual layer is cured after the imprinting. However, curing after each individual layer is not essential. Rather, on the basis of the determined through-curing depth of 300-500 μm, curing can also be carried out only after every 5th to 10th layer.

The curing preferably takes place with blue light in a wavelength range of 300 to 550 nm, preferably with a luminous power of 1000 mW/cm$^2$.

In detail, the operation of the hot-melt inkjet process is for example such that the ink, i.e. the slip, is transported in liquid form from a reservoir into a printhead, the core piece of which has a capillary that typically opens into a very thin capillary tip called a nozzle. The diameter of the nozzle is for example 100 μm. In the case of a typically used so-called "drop-on-demand" printhead, the capillary is surrounded immediately in front of the tip by a piezoelectric actuator which relays electrical pulses as pressure pulses through the capillary walls to the inks located in the capillary. The pressure pulses trigger shock waves in the ink that cause tiny discrete drops to be discharged from the capillary tip. This means that a very rapid succession of drops can be generated, namely at the frequency of the piezoelectric pulses, i.e. of the order of magnitude of a few hertz to a few kHz; the emitted drops typically have a diameter in the μm range and a volume ranging from nanoliters to picoliters. According to the invention, however, all other printing processes with which the slips according to the invention can be moulded in layers to form green compacts are also suitable.

The slip according to the invention is preferably imprinted at a temperature in the range from 60° C. to 140° C., particularly preferably from 70° C. to 120° C. and quite particularly preferably from 80° C. to 100° C., by which is meant the temperature in the printhead.

Immediately after the drops strike a construction platform or already printed-on layers, the printed amount of liquid solidifies. In addition, each layer is cured by photopolymerization and stabilized decisively by the resultant polymer network over the whole volume of the compact.

Simultaneously with the slip according to the invention, an easily removable support material can be imprinted—typically from a second printhead—and is subsequently removed from the cured green compact, for example by the selective melting out or selective chemical dissolution of the support material.

The cured green compact can then be further processed to form the final ceramic compact by then subjecting the green compact in step (b) to a heat treatment to remove the binding agent (debinding), in order to obtain a white body, and then sintering the white body in step (c).

During the debinding (b), the binding agent used, i.e. the wax and the polymerized monomers, plus possibly present thermally decomposable additives, is gradually removed by heating the green compact to a temperature of preferably 50° C. to 600° C., particularly preferably 150° C. to 500° C. Without wishing to be tied by this theory, it is believed that the thermal removal takes place as follows: the wax melts out and burns off "outside" the article, while the polymer network is still stable. At higher temperatures, this then depolymerizes and pyrolyzes, likewise any remaining additives.

The obtained white body is sintered in step (c) to form a dense ceramic compact. The sintering of the white body takes place in the sintering furnace, preferably at a temperature of 1100 to 1600° C., preferably 1400 to 1500° C., for zirconium dioxide, and 1400 to 1800° C., preferably 1600 to 1700° C., for aluminium oxide.

A particular advantage of the slips according to the invention is that the thermal debinding process, i.e. the complete burning off of the organic constituent, takes place, because of the mentioned stabilizing polymer network, without cracks in and damage to the microstructure or loss of structure and while maintaining the shape of the ceramic green compact. A subsequent sintering operation leads to a compaction of preferably >98%, preferably >98.5% and quite particularly preferably >99% of the theoretical density of the ceramic. A sintered ceramic compact prepared with the slip according to the invention preferably has a fidelity to detail of 100 μm or better, preferably deviating by at most 50 μm from the predefined scan data. The slips according to the invention even allow the rapid and time-saving execution of the debinding and subsequent sintering step in a single furnace process.

The slips of the present invention are preferably used for the preparation of ceramic compacts which are a dental restoration, such as e.g. an inlay, onlay, veneer, a crown, bridge or a framework.

The invention is now explained in more detail in reference to the figures and examples.

EXAMPLES

Example 1

Composition of the Slip:

| Component | Quantity | Proportion |
|---|---|---|
| ZrO$_2$ particles | 150 g | (35.7% by vol.; 78.2% by weight) |
| Paraffin wax | 20.310 g | (32.7% by vol.; 10.6% by weight) |
| PPG700DA | 11.858 g | (16.8% by vol.; 6.2% by weight) |
| 5-DAMS | 5.442 g | (7.7% by vol.; 2.8% by weight) |
| Octadecene | 2.020 g | (3.7% by vol.; 1.1% by weight) |
| Hypermer LP-1 | 2.000 | (3.2% by vol.; 1.0% by weight) |
| TEMPO | 0.001 g | (0.03% by vol.; 5 ppm by weight) |
| Photoinitiator | 0.03 g | (0.17% by vol.; 0.015% by weight) |

| Key: | |
|---|---|
| ZrO$_2$ | TZ-3YS-E (commercial grade) from Tosoh Corporation, Tokyo, JP (ZrO$_2$ stabilized with Y$_2$O$_3$, primary particle size 300-350 nm) |
| Paraffin wax | Melting point 54-56° C., viscosity (at 80° C. and at a shear rate of 1000 s$^{-1}$) 3-4 mPa · s (Siliplast; Zschimmer & Schwarz, Lahnstein, DE; contains in total approx. 0.5% emulsifier) |
| Hypermer LP-1 | Dispersion auxiliary based on a medium-chain polyester (Uniqema, GB.) |
| PPG700DA | Polypropylene glycol 700 diacrylate |
| 5-DAMS | Pentaerythritol diacrylate monostearate |
| TEMPO | 2,2,6,6-tetramethylpiperidinyloxyl |
| Photoinitiator | Bis(4-methoxybenzoyl)diethyl germanium |

Preparation of the Slip:

The wax, the monomers PPG700DA and 5-DAMS, and the dispersion auxiliary were introduced first at 70° C. in a dissolver (Dispermat®, VMA-Getzmann GmbH, Reichshof, DE). The $ZrO_2$ powder was added portionwise at low speeds. Once all the powder had been worked in, the speed was increased to 20,000 $min^{-1}$ and the whole mixed for at least 30 min. The heating occurring because of the high shear forces in the system makes any external heating unnecessary, and under certain circumstances cooling may actually be necessary. After the 30 min. of intensive stirring, the slip is cooled while being gently stirred. As long as the slip is still liquid, octadecene and TEMPO are added, plus the photoinitiator at the end. The viscosity of the slip is 103.2 mPa·s at a temperature of 80° C. and a shear rate of 1000 $s^{-1}$.

Example 2

Comparison Example, does not Contain Monomers

Composition of the Slip:

| Component | Quantity |
|---|---|
| $ZrO_2$ particles | 150 g |
| Paraffin wax | 32.867 g |
| Octadecene | 5.799 g |
| Hypermer LP-1 | 1.48 g |

The slip was prepared analogously to Example 1.

Example 3

Comparison Example, does not Contain Wax

Composition of the Slip:

| Component | % by weight |
|---|---|
| Ethoxylated pentaerythritol tetraacrylate (EPTA) | 3.50 |
| Urethane diacrylate (comprising 2,2,4-trimethylhexamethylene diisocyanate and hydroxypropyl acrylate) | 3.50 |
| Irgacure 819 (CIBA-GEIGY) | 0.50 |
| Hexanediol diacrylate | 3.00 |
| Dolacol D 1003 (Zschimmer & Schwarz) | 3.90 |
| 1-Octanol | 1.50 |
| PEG-300 | 3.00 |
| $ZrO_2$ 3Y TZP (Tosoh; contains 3 mol % $Y_2O_3$) | 81.00 |
| Pr(III) acetylacetonate | 0.10 |

Preparation of the Slip:

The liquid components listed above were introduced and the photoinitiator Irgacure 819 and the Pr(III) acetylacetonate dissolved therein accompanied by stirring. The $ZrO_2$ powder 3Y TZP, surface-modified with isobutyric acid, was then added portionwise in a Dispermat dissolver (VMA) at 15,000 rpm and dispersed for 30 min. until a highly-filled $ZrO_2$ slip with a level of filling of approx. 41% by vol. formed.

Example 4

Preparation of Ceramic Discs by Inkjet Process

To prepare the testpieces from the slip according to the invention (Example 1), a commercial inkjet printer was not used, but rather a laboratory rig based on a high-temperature printhead (type AD-K 140 from Microdrop, Norderstedt, DE). The printhead was fixed above a table mobile in three spatial directions which is controlled by precision step motors. The table can be lowered in the Z direction, whereby simple 3D articles can be prepared. The printhead has a heatable slip reservoir from where the slip is transported by an initial small negative pressure into the nozzle (=glass capillary with 100 µm diameter at the tip). The drops are emitted via pressure pulses of the piezo actuator which is attached around the nozzle in its lower region. A thin gold wire to heat the nozzle is attached immediately in front of the nozzle tip. With this arrangement, the slip was able to be printed precisely.

Process Parameters:

T in the reservoir 85° C./nozzle heating 100° C.

Pressure: −18 mbar

Voltage at the piezo 230 V

Printing frequency (frequency of the dispensing of the drops) 100 Hz

A plane was constructed by line-by-line printing, the next plane being printed perpendicular to it. After every third layer, curing was carried out by irradiation with blue light (20 s, exposure to light with Ivoclar Bluephase blue light lamp, manually). After the end of the printing process, the solid disc was removed from the holder (glass object holder) and debound and sintered according to the temperature profile described in Table 1 in a furnace (Nabertherm furnace HTC 08/16). The first two heating steps (debinding) were carried out incorporating circulating air, i.e. atmosphere exchange in the furnace for the purpose of evacuating the pyrolysis gasses.

Figure 2:
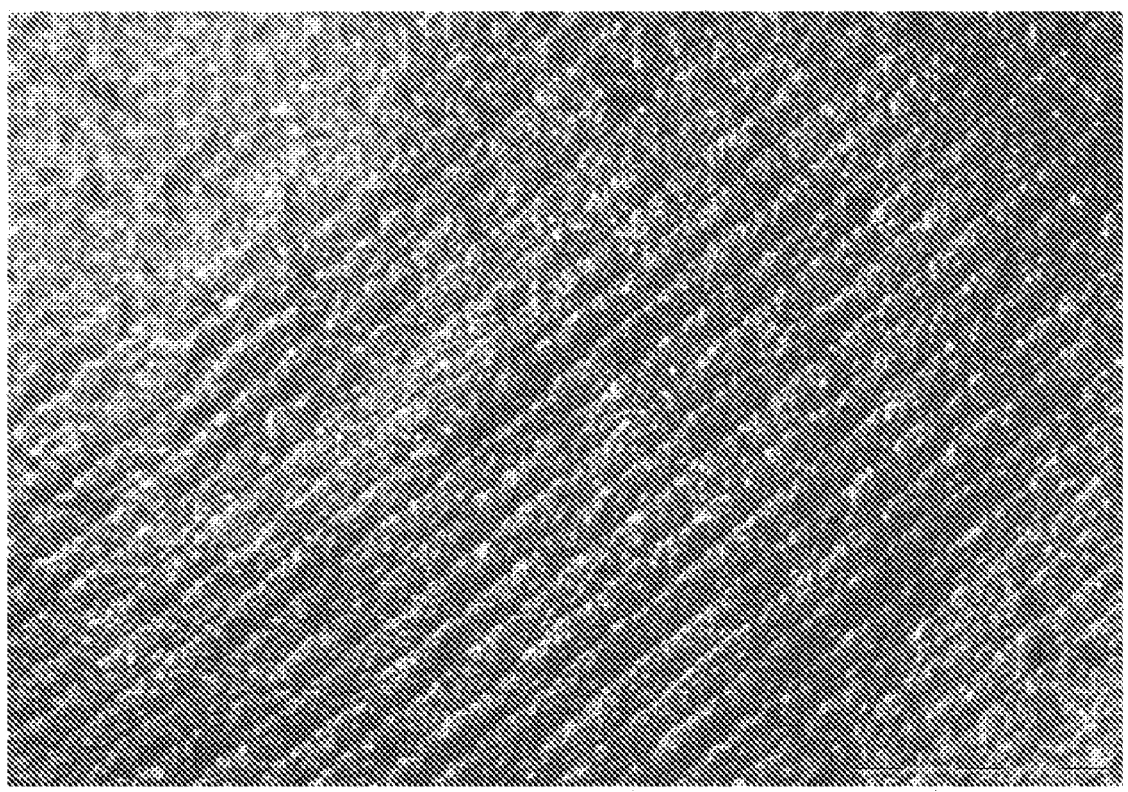
FIG. 2 shows the disc from FIG. 1 in a higher magnification.

FIG. 1 shows a disc prepared with the slip from Example 1. The linear structure of the top level of the disc can easily be seen. Even in a higher magnification (FIG. 2), the disc shows neither cracks nor other defects such as pores and the like.

TABLE 1

| T programme in the Nabertherm combi-furnace | | | | |
|---|---|---|---|---|
| Starting temp. [° C.] | Target temp. [° C.] | Time [min.] | Heating rate [° C./min.] | Holding time [min.] |
| 30 | 200 | 17 | 10.0 | 10 |
| 200 | 500 | 150 | 2.0 | 30 |
| 500 | 1100 | 20 | 30.0 | 5 |
| 1100 | 1350 | 25 | 10.0 | 0 |
| 1350 | 1500 | 5 | 30.0 | 30 |
| 1500 | 800 | 35 | 20.0 | 0 |
| 800 | 30 | 30 | 25.7 | 0 |
| | | Total process time: | | 357.0 |

Example 5

Preparation of Ceramic Discs by Hot Moulding

Discs with a diameter of 20 mm and a height of 1.7 mm (in the green state) were prepared in the hot-moulding process (low-pressure injection moulding) from the slip according to the invention (Example 1) and the slips according to the comparison examples 2 and 3. The discs from the slips of Examples 1 and 3 were cured by irradiation with blue light (2×60 s, exposure to light with Ivoclar Bluephase blue light lamp). The discs were then debound in an atmosphere according to the temperature profile summarized in the table on a bed packed with beads ($ZrO_2$ beads 2 mm in diameter) and sintered.

TABLE 2

| Starting temp. [° C.] | Target temp. [° C.] | Time [min.] | Heating rate [° C./min.] | Holding time [min.] |
|---|---|---|---|---|
| 30 | 500 | 470 | 1.0 | 90 |
| 500 | 1100 | 40 | 15.0 | 0 |
| 1100 | 1350 | 71 | 3.5 | 0 |
| 1350 | 1500 | 30 | 5.0 | 30 |
| 1500 | 800 | 35 | 20.0 | 0 |
| 800 | 30 | 30 | 25.7 | 0 |
| | | Total process time: | | 796.0 |

FIGS. 3 to 7 show photographs of the sintered discs.

Figure 3:
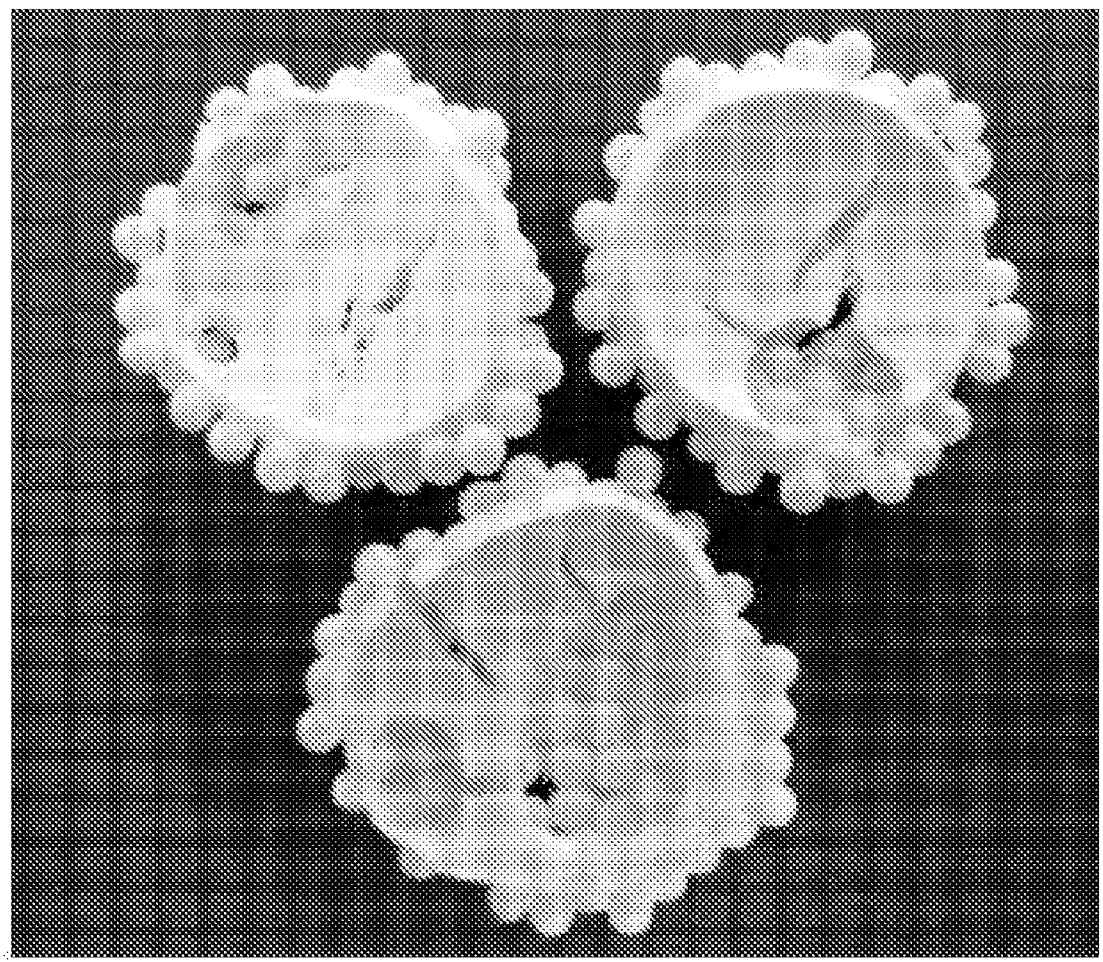
FIGS. 3 to 7 show photographs of sintered discs which were prepared in the hot-moulding process (low-pressure injection moulding).

FIG. 3 shows discs according to comparison example 2 with a pure wax matrix. It is clear here that during heating the wax flows out into the bed packed with beads and the structure of the article is completely lost. At higher temperatures, the beads fuse with the sample. Similar results are to be expected if the ceramic compacts which are prepared according to the disclosure from Seerden et al. (J. Am. Ceram. Soc. 84(11): 2514-2520 (2001), which is hereby incorporated by reference in its entirety) and which likewise have a pure wax matrix are debound and sintered.

Figure 4:
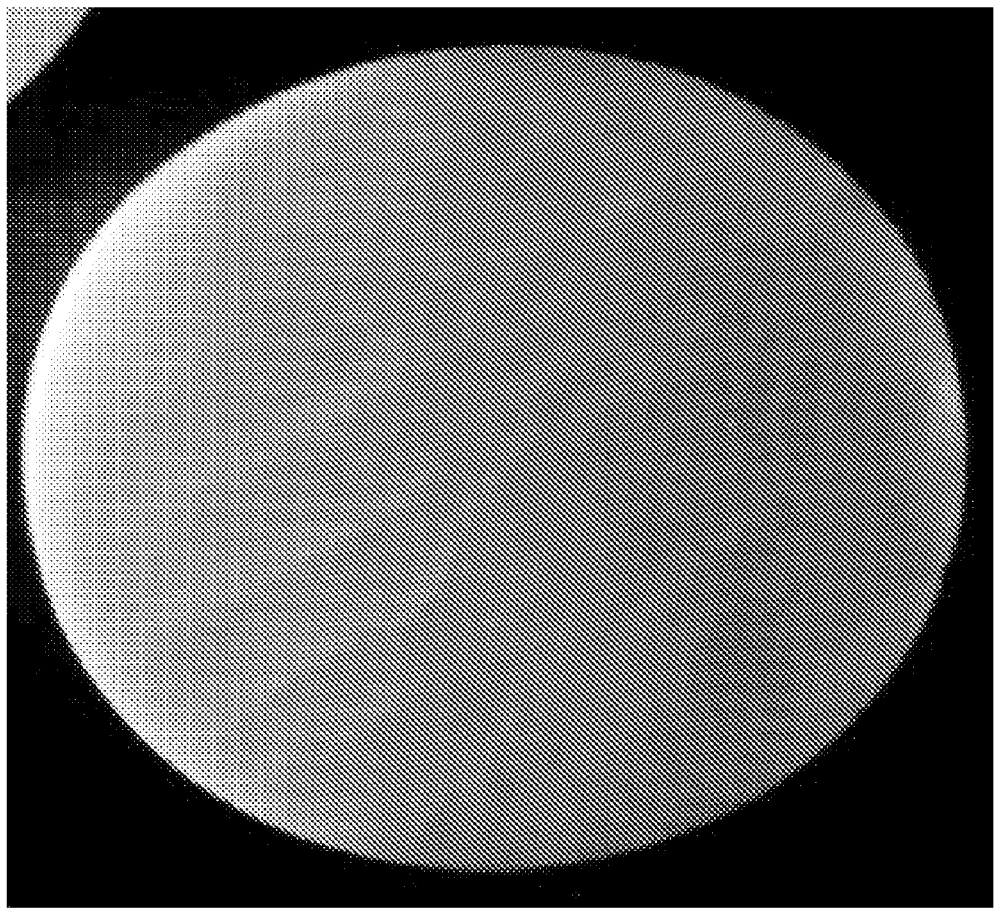
Figure 5:
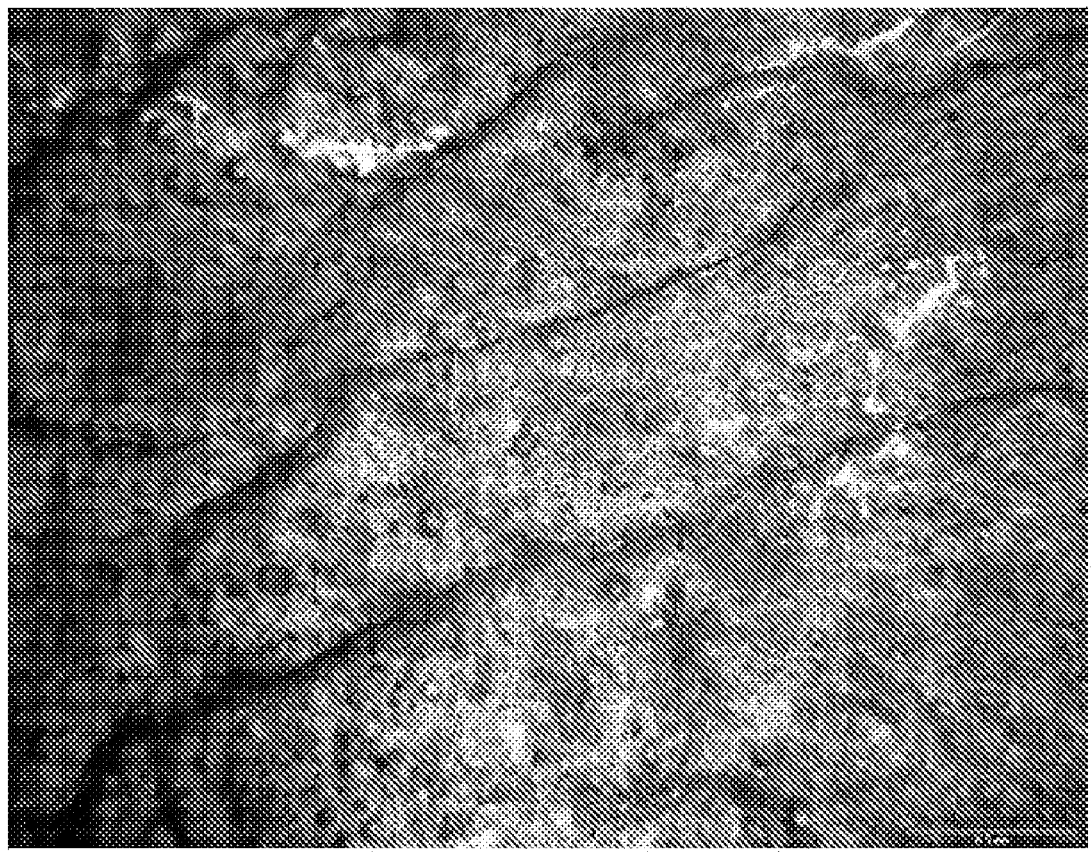

FIG. 4 shows discs according to comparison example 3 which were prepared from a slip containing only the monomers. FIG. 5 shows the surface of these discs. The geometry of the discs is preserved, but the entire volume is shot through with fine cracks formed during the debinding.

Figure 6:
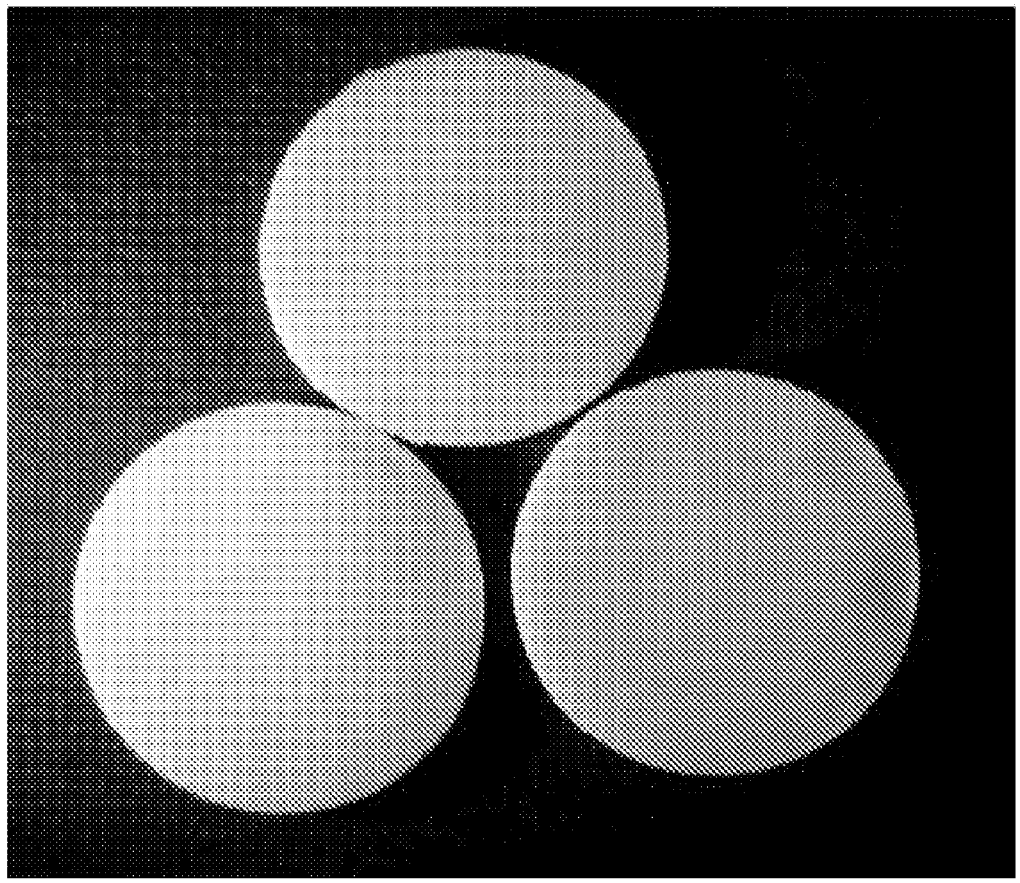
Figure 7:
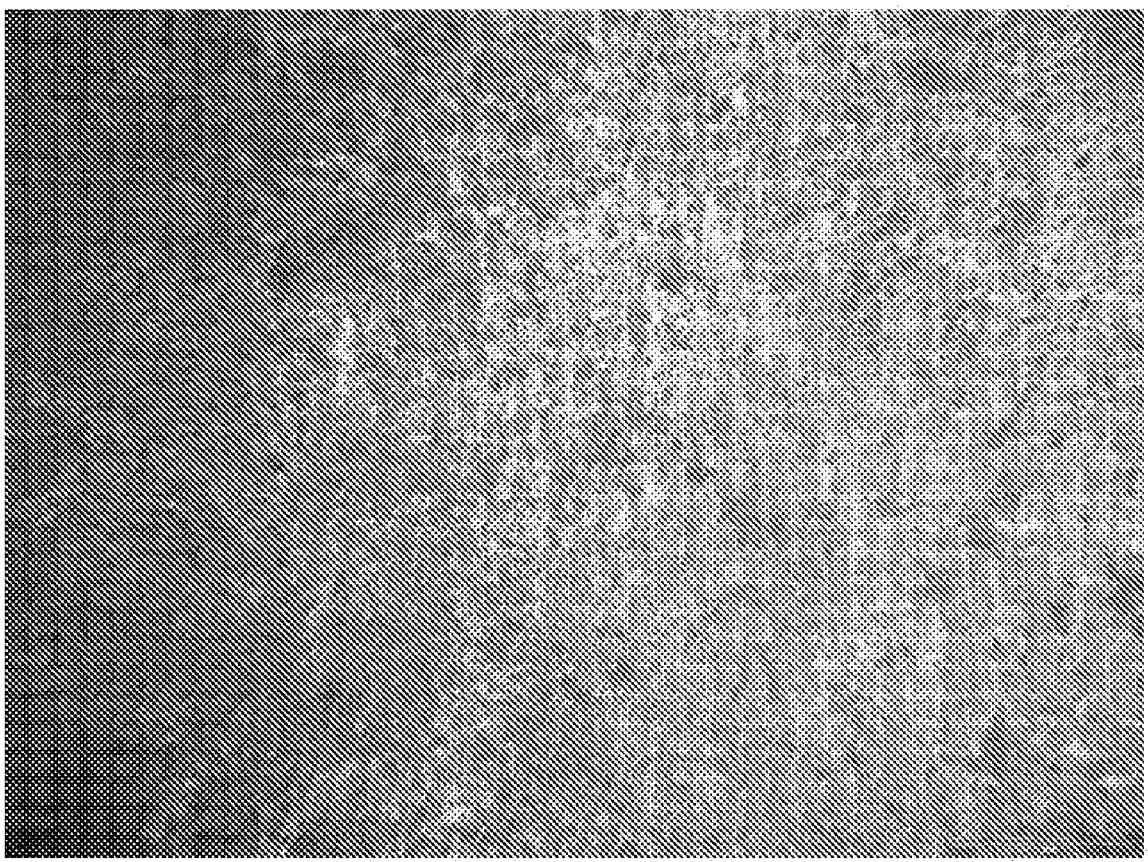

FIG. 6 shows discs made from the slip according to the invention (Example 1) and FIG. 7 their surface. During thermal debinding, the wax components can flow out, while the structure is held by the polymer network. After the debinding and sintering, the three-dimensional structure of the sample is preserved, the surface and microstructure are homogeneous and no cracks whatever caused by the debinding process can be seen. The final density of the sintered discs was 6.063 g/cm$^{-3}$, corresponding to 99.55% of the theoretical density.

The further processing of the cast discs to form the sintered final product shows that the debinding and sintering properties of the slip according to the invention are excellent.

Although preferred embodiments have been depicted and described in detail herein, it will be apparent to those skilled in the relevant art that various modifications, additions, substitutions, and the like can be made without departing from the spirit of the invention and these are therefore considered to be within the scope of the invention as defined in the claims which follow.

What is claimed:

1. A slip for use in a hot-melt inkjet printing process, comprising:
   (A) 25 to 45% by vol. ceramic particles,
   (B) 25 to 50% by vol. wax having a melting point in the range from 40 to less than 80° C.,
   (C) 10 to 40% by vol. one or more polymerizable monomers, and further comprises
   (D) 0.001 to 3% by vol. initiator for radical polymerization, and optionally
   (E) 0.1 to 15% by vol. further additives
   in each case relative to the total composition of the slip, the slip having a solid paste-like to solid consistency at 20° C. and being printable at a temperature within the range from 60° C. to 140° C., wherein component (B) comprises a petrochemical wax.

2. The slip according to claim 1, wherein component (A) comprises oxide ceramic particles.

3. The slip according to claim 2, wherein component (A) comprises oxide ceramic particles based on $ZrO_2$ and/or $Al_2O_3$, which is stabilized with CaO, $Y_2O_3$, $CeO_2$ and/or MgO.

4. The slip according to claim 1, wherein component (C) comprises at least one monomer which has one or more (meth)acryloyloxy groups.

5. The slip according to claim 4, wherein component (C) comprises at least one monomer which is selected from acrylates and diacrylates with a chain length of alcohol residue of $C_8$ to $C_{18}$; polyacrylated glycols; polyacrylated short- to medium-chain polypropylene glycols and pentaerythritoldiacrylate monocarboxylates with a chain length of $C_8$ to $C_{18}$.

6. A process for the preparation of ceramic compacts comprising using a slip according to claim 1 for the preparation of a dental restoration comprising an inlay, onlay, veneer, a crown, bridge or a framework.

7. A process for the preparation of a green compact, in which a slip according to claim 1 is moulded in layers to the geometrical shape of the green compact and subjected to a radical polymerization in order to obtain a cured green compact.

8. The process according to claim 7, in which the layered structure of the geometric shape is effected by layered inkjet printing.

9. The process for the preparation of a green compact according to claim 8, in which the slip is printed at a temperature in the range from 60° C. to 140° C.

10. The ceramic green compact obtained according to the process of claim 7.

11. A process for the preparation of a ceramic compact, comprising
   (a) preparing a green compact according to the process of claim 7,
   (b) the green compact is then subjected to a heat treatment to remove the binding agent (debinding), in order to obtain a white body, and
   (c) the white body is dense sintered.

12. The slip according to claim 3, wherein component (A) contains oxide ceramic particles of pure $ZrO_2$, pure $Al_2O_3$, pure $ZrO_2$—$Al_2O_3$, $ZrO_2$, or $ZrO_2$—$Al_2O_3$.

13. A slip for use in a hot-melt inkjet printing process, comprising:
   (A) 25 to 45% by vol. ceramic particles,
   (B) 25 to 50% by vol. wax having a melting point in the range from 40 to less than 80° C.,
   (C) 10 to 40% by vol. one or more polymerizable monomers which are solid at 20° C., and further comprises
   (D) 0.001 to 3% by vol. initiator for the radical polymerization, and optionally
   (E) 0.1 to 15% by vol. further additives
   in each case relative to the total composition of the slip, the slip having a solid paste-like to solid consistency at 20° C. and being printable at a temperature within the range from 60° C. to 140° C., wherein component (B) comprises a petrochemical wax.

* * * * *